United States Patent

DeWoody

[15] 3,695,642
[45] Oct. 3, 1972

[54] FLEXIBLE PRESSURE-TYPE JOINT FOR RIGID TUBING

[72] Inventor: Charles M. DeWoody, Vineland, N.J.

[73] Assignee: Ace Glass Incorporated, Vineland, N.J.

[22] Filed: Jan. 7, 1970

[21] Appl. No.: 1,226

Related U.S. Application Data

[63] Continuation-in-part of Ser. No. 673,376, Oct. 6, 1967, Pat. No. 3,499,670.

[52] U.S. Cl.............285/133 R, 285/223, 285/346, 285/351, 285/353, 285/355, 285/423
[51] Int. Cl..............................................F16l 47/00
[58] Field of Search..285/351, 353, 346, 133 R, 138, 285/355, 340, 223, 423, DIG. 12

[56] References Cited

UNITED STATES PATENTS

| | | | |
|---|---|---|---|
| 3,499,670 | 3/1970 | DeWoody | 285/355 |
| 1,396,452 | 11/1921 | Moesmer | 285/355 X |
| 2,268,263 | 12/1941 | Newell et al. | 285/138 X |
| 2,560,263 | 7/1951 | Wiegand et al. | 285/351 X |
| 2,937,891 | 5/1960 | Gressel | 285/390 X |
| 2,983,506 | 5/1961 | Bertsch et al. | 285/133 R |
| 3,323,874 | 6/1967 | Phillips | 285/DIG. 12 |

FOREIGN PATENTS OR APPLICATIONS 1,060,239   3/1967   Great Britain ........285/133 R

*Primary Examiner*—Dave W. Arola
*Attorney*—G. Mallet Prevost

[57] ABSTRACT

A pressure-type joint for connecting one tubular element formed of non-flexible plastics material and provided with an externally threaded male portion, into a second tubular element formed of glass and having an internally threaded female portion. The externally threaded element is provided with a central, longitudinal bore for receiving a thermometer or the like, and the threads of this element are of sufficiently reduced dimensions with respect to the internal threads of the other element to provide an annular clearance between the threads to permit relative angular movement of the joined elements so as to minimize chances of breaking the thermometer or the like. Compressible O-rings are interposed between the threaded end of each element and a radial shoulder formed on the opposite element to insure a tight seal of the joint, despite relative annular movement of the joined elements, one of the O-rings surrounding the thermometer in the externally threaded element and serving the dual function of sealing the joint and also the inserted thermometer or the like.

6 Claims, 10 Drawing Figures

INVENTOR
CHARLES M. DeWOODY
BY
ATTORNEY

FLEXIBLE PRESSURE-TYPE JOINT FOR RIGID TUBING

This application is a continuation-in-part of my copending application Ser. No. 673,376, filed Oct. 6, 1967 and now U.S. Pat. No. 3,499,670.

BACKGROUND OF INVENTION

In the past, there have been problems in securing a true pressure-tight seal when coupling two sections of glass tubing, such for example, as used in laboratories and chemical systems. Ground conical couplings require springs which must be of a low tension and, therefore, tend to blow out readily.

A ground ball and socket joint is fastened together with a clamp, and if sufficient pressure is exerted on the glass to create a seal which is effective at more than 75 lbs. psig, the rate of breakage is very significant.

Flange-type joints are very limited in flexibility, and also are prone to breakage from over-tightening the clamp to make seals effective at over 50 lbs. psig.

Flexible joints which rely on the flexibility of the threaded coupling elements per se for angular relative movement will deform sufficiently to form a leak path and do not provide sufficient thread shear force resistance.

SUMMARY

In glass chemical equipment, a certain degree of angular flexibility is necessary to compensate for thermal expansion and misalignment of equipment for feeding from reservoirs into reactors and the like. The joint of the present invention provides increased angular flexibility, reduces breakage, and insures a tight seal at pressure over 200 lbs. psig, which is above the normal operating pressures for glass standard wall pipe equipment.

In my said copending application, two internally threaded sections of glass tubing are coupled by a substantially cylindrical element formed of a plastic material or filled plastics material softer than the glass tubing, and having a central, annular, radial flange which terminates axially at opposite ends in externally threaded nipples. The external threads of the nipples are of sufficiently reduced dimensions with respect to the internal threads of the glass tubing to provide an annular clearance which permits substantial angular relative movement of the glass tubing. Annular compressible seals are interposed between the ends of the glass tubing and the adjacent faces of the respective central flange.

This same principle is employed in the present invention, in connection with various other items of laboratory equipment, such as threaded glass thermometer adapters, where a thermometer extends through a threaded plastic bushing which tightens into a complementary glass female member. The difference in the thread dimensions of the bushing and glass member provide the desired flexibility, and suitable O-rings are employed to maintain a tight seal, despite relative angular movement of the bushing and glass member. This angular flexibility is effective in minimizing thermometer breakage.

THE DRAWINGS

Referring to the drawings in which numerals of like character designate similar parts throughout the several views.

DETAILED DESCRIPTION

Figure 1:
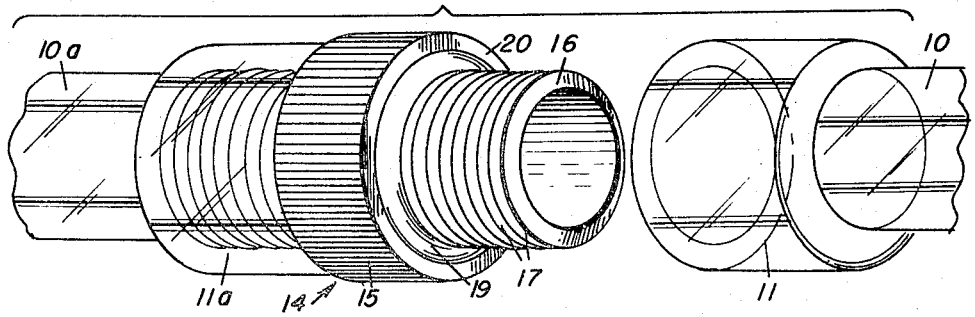
FIG. 1 is an exploded, fragmentary, perspective illustrating the parts of the joint.
Figure 2:
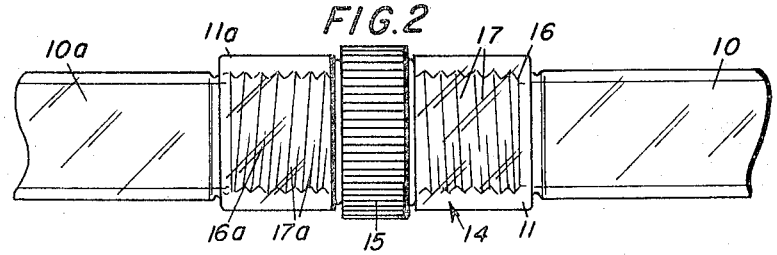
FIG. 2 is a view in side elevation showing the assembled joint with the two coupled sections of glass tubing axially aligned.
Figure 3:
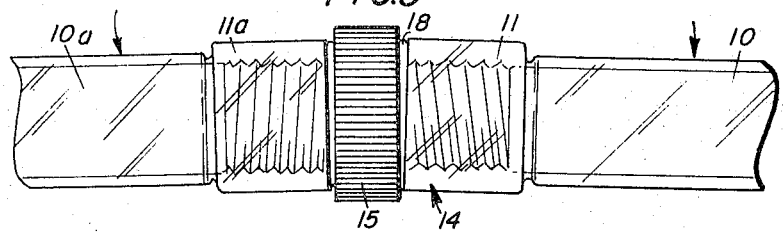
FIG. 3 is a similar view illustrating the relative angular movement of the two sections of tubing.

In the drawings, 10 and 10a represent two sections of glass tubing to be coupled. In the form of the invention illustrated, these sections of tubing respectively terminate at one end in bell portions 11, 11a, which are internally threaded as at 12, FIGS. 4 and 5. While the invention is primarily concerned with the coupling of sections of glass tubing, it may be noted that rigid tubing formed of suitable plastics and other materials is also contemplated, and, therefore, in the claims, the terms "glass" and "rigid" are intended to also embrace these other materials.

The coupling element of the invention is generally indicated at 14, and comprises an annular, radial flange 15 which terminates axially at opposite ends in integral, externally threaded nipples 16 and 16a. The coupling is preferably formed of such plastics as nylon, polytetrafluoroethylene (Teflon), polytrifluorochloroethylene (Kel-F), and the like, although hard rubber or other suitable material may be employed. Hence, in the claims, the term "plastics material" is intended to include both plastics of the type above referred to, as well as hard rubber and other suitable material including filled plastics so long as its surface does not abrade the mating threads.

Figure 4:
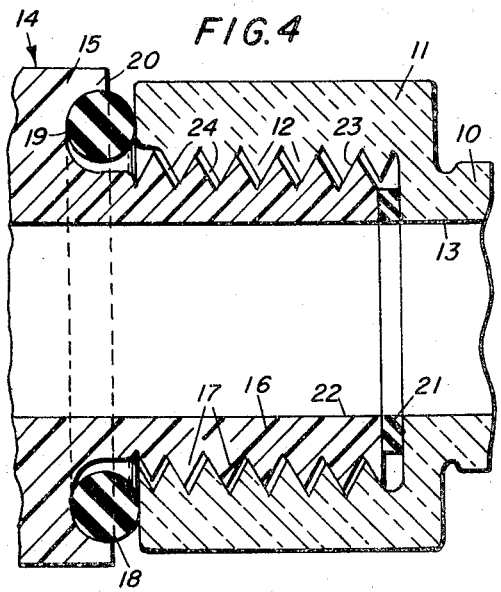
FIG. 4 is an enlarged, longitudinal, sectional view, illustrating the differences in the respective thread dimensions of a tube section and coupling nipple.
Figure 5:
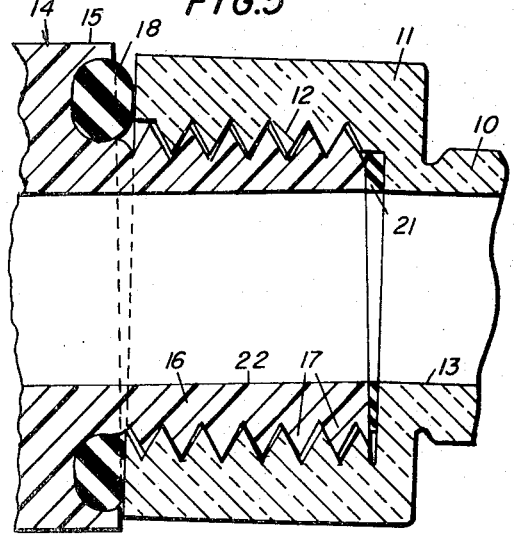
FIG. 5 is a similar view showing a section of tubing undergoing relative angular movement.

The nipples 16 and 16a are externally threaded as at 17, and, as best seen in FIG. 4, the nipple threads are of sufficiently reduced dimensions with respect to the internal threads 12 of the bell 11, to permit relative angular movement of the coupled tubing sections, as seen in FIG. 5. The difference between the thread dimensions of the nipple and bell can vary so long as there is an area of threaded engagement of a minimum depth of one-half a thread, which is sufficient to provide mechanical thread shear force resistance to effect tight engagement of the threads when the joint is completely assembled. Also, the respective thread contours may differ, that is, one can be curved in cross-section, and the other V-shaped, provided there is a sufficient area of threaded engagement.

Opposite faces of the annular flange 15 are recessed as at 19 to receive suitable seals, such as the O-rings 18 shown in the drawing. The annular lips 20 of the recesses 19 are longitudinally offset from the corresponding ends of the bells 11 so as to accommodate the required relative movement in the angular adjustment of the tubing sections. The cross-sectional contour of the grooves 19 is semi-eliptical so that the inner edges of the lips 20 overlie the outer peripheries of the O-rings 18 to retain them in place, while, at the same time, accommodating the deformation of the rings under compression when the tubing sections are undergoing relative angular adjustment, as best seen in FIG. 5.

Preferably, the bores 13 of the tubing sections 10, 10a are of the same diameter as the bore 22 of the nipples 16, 16a, so as to avoid any restriction of flow through the joint.

In addition to the O-rings 18, supplemental sealing rings 21 of compressible material may be employed between the bases of the bells 11, 11a and the adjacent ends of the nipples 16, 16a.

It is also conceivable that in a modified adaptation of the invention, the reduced male threads 17 of the nipples 16, 16a may be coated with a compressible substance, substantially filling the intervening spaces between the complementary threads, so that the joint relies on the compressibility of this material for angular flexing of the coupled tubing sections.

As previously noted, the difference in dimensions of the coacting threads 12 and 17 is controlled so as to maintain a mechanical thread shear force resistance as at 23 in FIG. 4, and the material of which the coupling element 14 is formed must be sufficiently stiff and non-flexible to provide such mechanical thread shear force resistance as to effect a tight engagement of the threads. Thus, when the bell 11 is screwed onto the nipple 16, a tight threaded engagement is effected to insure a tight compression and sealing engagement with the O-ring 18. However, upon angular movement of the tubing section 10 with respect to the coupling element, the spaces 24 between the non-contacting areas of the threads, accommodate the angular adjustment of the tubing sections on the nipples, while a tight seal is maintained between the bell and the flange by virtue of the compressible O-ring 18.

The invention provides an angularly adjustable joint which will insure a tight seal at high pressures of from 15 psi to the order of 200 psi.

Figure 6:
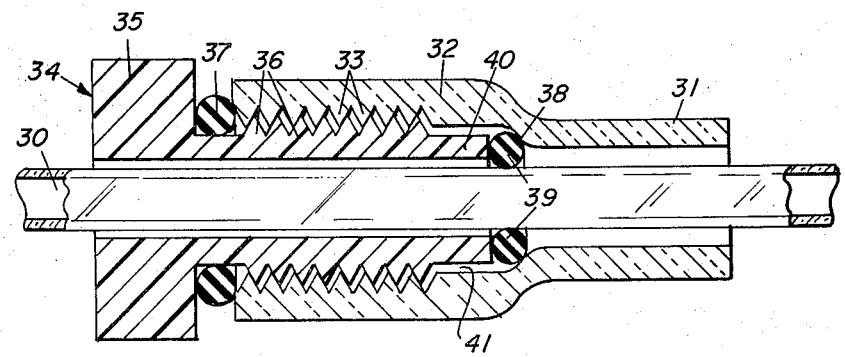
FIG. 6 shows a modification for use in slidably coupling a tube of reduced diameter to a larger tube.

Referring now to FIGS. 6–10, which illustrate the modified embodiments of the invention covered by the present continuation-in-part application, it will be noted that the same basic principle of differences in thread diameters and coacting sealing rings is employed to obtain the desired flexibility between the coupled elements. In FIG. 6, the joint is designed to couple a smaller tube 30 to a tube 31 of larger diameter. The tube 31 is provided at its end with an enlarged bell 32 having internal threads 33. A plastic adapter 34, having a radially enlarged head 35, is externally threaded as at 36. As in the previously described form of the invention, the external threads 36 of the adapter are of sufficiently reduced dimensions with respect to the internal threads 33 of the tubing bell 32 to provide an annular clearance which permits substantial angular relative movement of the glass tubing 31 with respect to the adapter 34.

In this form of the invention, sealing rings 37 are interposed between the flat surface or shoulder formed by the head 35 and the end of the bell 32, and the longitudinal spacing between the end of the bell and the shoulder of the head 35 is maintained by the sealing ring 37, so as to accommodate angular relative movement of the adapter and tubing bell when the sealing ring is compressed.

Still referring to FIG. 6, it will be noted that at the base of the bell 32, the tube 31 is provided with an inwardly directed, annular shoulder 38 which is curved in cross section as shown. This shoulder supports a second sealing ring 39 which is engaged by a projection 40 on the threaded extremity of the adapter 34, there being an annular space 41 between the projection 40 and the inner periphery of the bell 32 to accommodate angular movement of the adapter. In this form of curved shoulder 38, it will be observed that the sealing ring 39 serves the dual purpose of sealing the end of the adapter with respect to the bell, as is the case with the seal 21 of FIGS. 4 and 5, and also seals the bell around the outer periphery of the smaller tube 30. Thus, when the adapter is tightened into the bell, the sealing rings 37 and 39 maintain a tight seal despite angular manipulation of the adapter and bell 32, and the seal 39 maintains this tight seal against the periphery of the smaller tube 30 when the latter is slid or moved in the adapter and larger tube.

Figure 7:
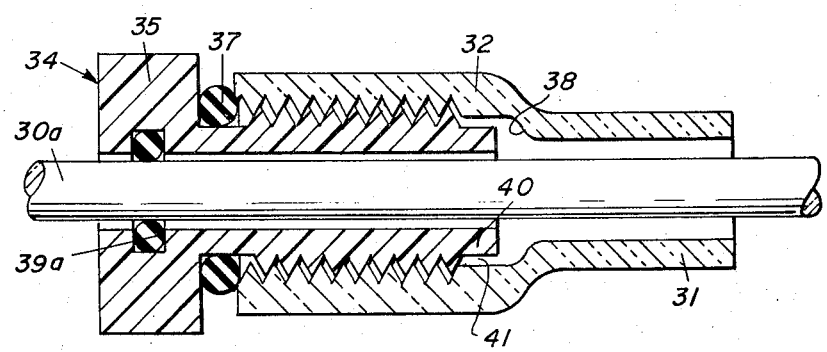
FIG. 7 is a sectional view of a similar modification for use as a thermometer adapter.

FIG. 7 illustrates a generally similar modification for handling lower pressures, and wherein the smaller tube 30 is replaced by a glass arm 30a in a feed-through arrangement to manipulate materials in a dry box or other type chamber (not shown) with a controlled internal atmosphere. In this form of the invention, the O-ring 39 may be eliminated and a compressible seal 39a may be interposed between the bore of the head 35 and the periphery of the arm 30a. The arm 30a is in slidable engagement with the adapter 34 and can be rotated.

Figure 8:
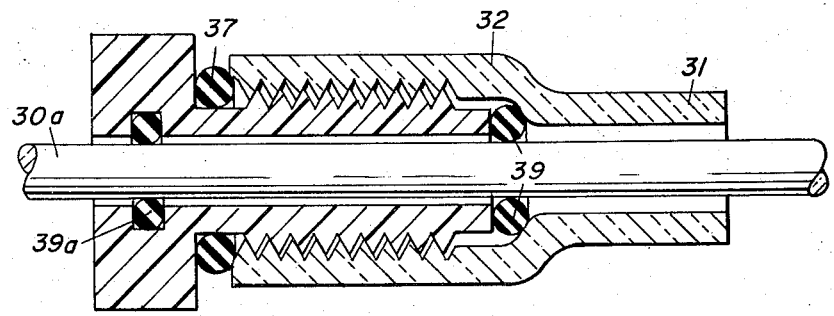
FIG. 8 is another generally similar modification showing a different arrangement of O-rings.

FIG. 8 shows the same embodiment as in FIG. 7, but arranged for high vacuum work such as pressures of $10^{-8}$ Torr., where seals 39 and 39a may be used in addition to seal 37 to lower the intrinsic leak rate to the order of $10^{-7}$ liter atmosphere/day.

Figure 9:
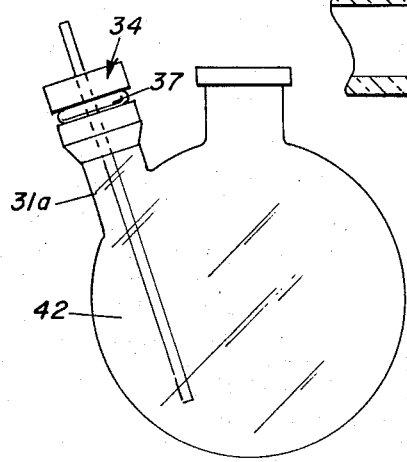
FIG. 9 shows the device of the present invention for use in sealing a thermometer into a flask.

FIG. 9 shows one use of the invention of the present continuation-in-part, such for example, as a flask 42 having a thermometer adapter 34 arranged in its neck 31a, the latter being the equivalent of the glass tube 31 in FIGS. 6, 7 and 8.

Figure 10:
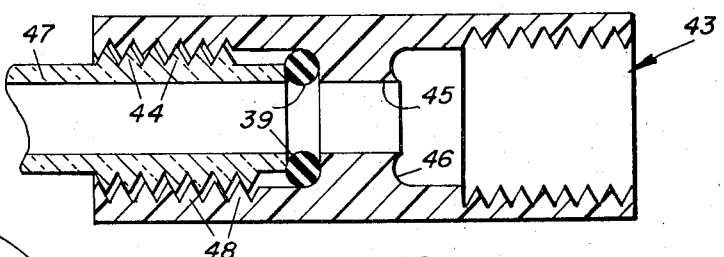
FIG. 10 is a still further modification wherein the coupling embodies the reverse construction of that illustrated in FIGS. 1–3, wherein the plastic component has an internal flange and is internally threaded, and the glass pipe has an external thread.

FIG. 10 shows a modification of a coupling for performing substantially the same function as the coupling of FIGS. 1–5, but with a reversal of the flange and thread arrangement. In this modified form, the plastic coupling element 43, instead of having externally threaded nipples as in the previous forms, is provided with internal threads 44, and an inwardly directed annular flange 45 forms the seal-engaging shoulder. This shoulder is provided on its fore and aft faces with annular grooves 46 into which the O-rings 39 are compressed between the ends of the externally threaded portions 48 of the glass tubing sections 47 which are being coupled.

In all of these forms of the invention, the extensions 40 on the ends of the externally threaded male members may be eliminated and the ends of these members shaved off to obtain a precise compression of the coacting O-rings.

It will be apparent that the joint of the invention clearly distinguishes and represents an improvement over purely flexible coupling elements which rely entirely on their flexibility for angular adjustment. As before pointed out, a wholly flexible coupling element deforms sufficiently to form a leak path, and, furthermore, would not provide the necessary thread shear force resistance.

From the foregoing, it is believed that the invention may be readily understood by those skilled in the art without further description.

I claim:

1. A pressure-type joint for the internally threaded end of a first tubular element and the externally threaded end of a second tubular element, one of said threaded elements being composed of a substantially non-flexible plastics material softer than that of the other threaded element, one of said threaded elements being provided with a radial shoulder at the inner extremity of its threaded area, said external threads and said second threaded element being of sufficiently reduced dimensions with respect to said first threaded element and the internal threads thereof to provide an annular clearance to permit substantial transverse angular movement of said elements relative to each other, an annular compressible seal engaging said shoulder, which, when the joint is assembled and tightened, is of sufficient thickness to provide a longitudinal spacing between said shoulder and the end of said other element, said seal being sufficiently compressible when assembled to accommodate the relative angular movement of said elements while still maintaining a seal, an elongated third element slidably insertable longitudinally through said engaging threaded elements, and an annular compressible sealing ring means engaging the periphery of said insertable third element between the latter and a surrounding threaded element, said third element having sufficient clearance relative to said threaded elements to accommodate said angular movement.

2. A pressure-type joint for the internally threaded end of a first tubular element and the externally threaded end of a second tubular element, one of said threaded elements being composed of a substantially non-flexible plastics material softer than that of the other threaded element, said threaded elements being provided with radial shoulders at the inner extremities of their threaded areas, said external threads and said second threaded element being of sufficiently reduced dimensions with respect to said first threaded element and the internal threads thereof to provide an annular clearance to permit substantial transverse angular movement of said elements relative to each other, annular compressible seals interposed between and engaging the shoulders of said elements and the adjacent ends of the opposite elements, respectively, which, when the joint is assembled and tightened, are of sufficient thickness to provide a longitudinal spacing between each shoulder and the adjacent end of the opposite element, said seals being sufficiently compressible when assembled to accommodate the relative angular movement of said elements while still maintaining a seal, an elongated third element slidably insertable longitudinally through said engaging threaded elements, and an annular compressible sealing ring means engaging the periphery of said insertable third element between the latter and a surrounding threaded element.

3. A joint as claimed in claim 2, wherein the internally threaded element is provided with an internally directed, radial shoulder and one of said seals is interposed between said last-named shoulder and the end of the externally threaded element.

4. A joint as claimed in claim 3, wherein said last-named seal additionally engages the periphery of said third element and serves the dual purpose of sealing the joint and sealing the third element within the externally threaded element.

5. A joint as claimed in claim 4, wherein the seal engaging surface of said internally directed radial shoulder is arcuate in cross-section, with its open area directed axially of said joint.

6. A pressure-type joint for the internally threaded end of a first tubular element and the externally threaded end of a second tubular element, one of said elements being composed of substantially non-flexible plastics material softer than that of the other threaded element, the internally threaded element being provided with an inwardly directed radial shoulder adjacent the inner extremity of its threaded area, said external threads and said second threaded element being of sufficiently reduced dimensions with respect to said first threaded element and the internal threads thereof to provide an annular clearance to permit substantial angular transverse movement of said elements relative to each other, an annular, compressible seal engaging the shoulder of said internally threaded element, which, when the joint is assembled and tightened, is of sufficient thickness to provide a longitudinal spacing between said shoulder and the end of said externally threaded element, said seal being sufficiently compressible when assembled to accommodate the relative angular movement of said elements while still maintaining a seal, said internally threaded element having an end which surrounds said externally threaded element, said externally threaded element having an outer cylindrical surface adjacent to said end of said internally threaded element, substantially uniformly smaller in diameter than said end of said internally threaded element, and free of a seal thereto.

* * * * *